United States Patent
Heravi et al.

(10) Patent No.: US 6,334,832 B1
(45) Date of Patent: Jan. 1, 2002

(54) CONTROL FOR VEHICLE DIFFERENTIAL

(75) Inventors: Oliver Heravi, Tigard; Mark J. Fogelberg; Michael L. McMorris, both of Milwaukie, all of OR (US)

(73) Assignee: Warn Industries, Inc., Milwaukie, OR (US)

(*) Notice: Subject to any disclaimer, the term of this patent is extended or adjusted under 35 U.S.C. 154(b) by 2 days.

(21) Appl. No.: 09/585,720

(22) Filed: May 31, 2000

(51) Int. Cl.$^7$ .................................. F16H 48/20
(52) U.S. Cl. .................. 475/85; 475/150; 475/221
(58) Field of Search .................. 475/221, 231, 475/150, 238, 239, 232, 85

(56) References Cited

U.S. PATENT DOCUMENTS

| | | | |
|---|---|---|---|
| 1,938,457 A | * 12/1933 | McCaffery | 475/225 |
| 2,709,927 A | * 6/1955 | Van Meter | 475/231 |
| 3,034,322 A | * 5/1962 | Miller | 475/89 |
| 4,691,593 A | 9/1987 | Mueller | |
| 4,757,728 A | 7/1988 | Pitsch | |
| 5,338,266 A | * 8/1994 | Guimbretiere | 475/232 X |
| 5,358,084 A | 10/1994 | Schramm | |
| 5,598,908 A | 2/1997 | York | |
| 5,711,746 A | 1/1998 | Carlson | |
| 5,779,013 A | 7/1998 | Bansbach | |
| 5,816,372 A | 10/1998 | Carlson | |
| 5,823,309 A | 10/1998 | Gopaslwamy | |
| 5,845,752 A | 12/1998 | Gopaslwamy | |
| 5,845,753 A | 12/1998 | Bansbach | |
| 5,848,678 A | 12/1998 | Johnston | |
| 5,911,643 A | 6/1999 | Godlew | |
| 5,915,513 A | 6/1999 | Isley | |
| 5,989,142 A | * 11/1999 | Satzler | 475/150 |

* cited by examiner

*Primary Examiner*—Dirk Wright
*Assistant Examiner*—Ankur Parekh
(74) *Attorney, Agent, or Firm*—Robert L. Harrington

(57) ABSTRACT

A control for a differential for controlling the relative rotation of a pair of axles extended from the differential to a front or rear pair of wheels. An indicator shaft is coupled to the axles, e.g., through a planetary gear arrangement (the indicator shaft being the sun gear) whereby when the axles rotate in unison the ring gear and planet gear set of the planetary gear arrangement are synchronized to not drive the sun gear/indicator shaft. When one axle rotates at a rate different than the other, the sun gear is rotated. A brake mechanism is coupled to the sun gear. A sensor senses the rotational rate as well as the acceleration of the sun gear. A controller is provided to control the braking of the sun gear. Braking of the sun gear will force the axles to rotate in unison.

8 Claims, 3 Drawing Sheets

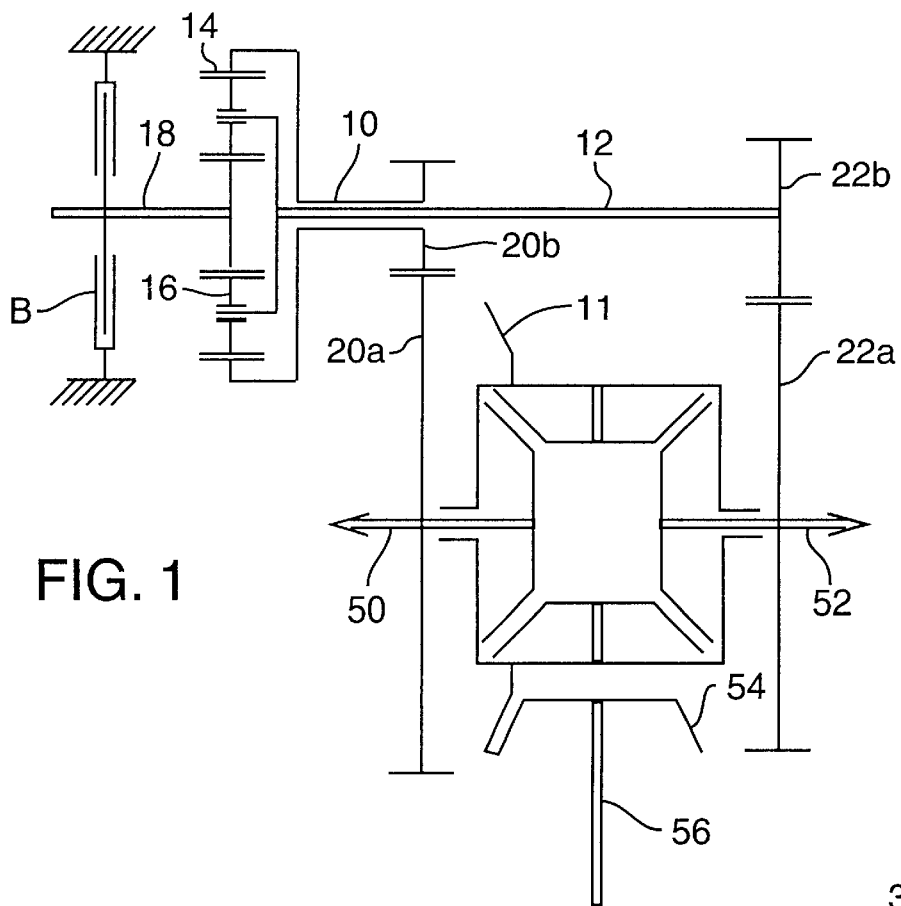
FIG. 1
FIG. 2
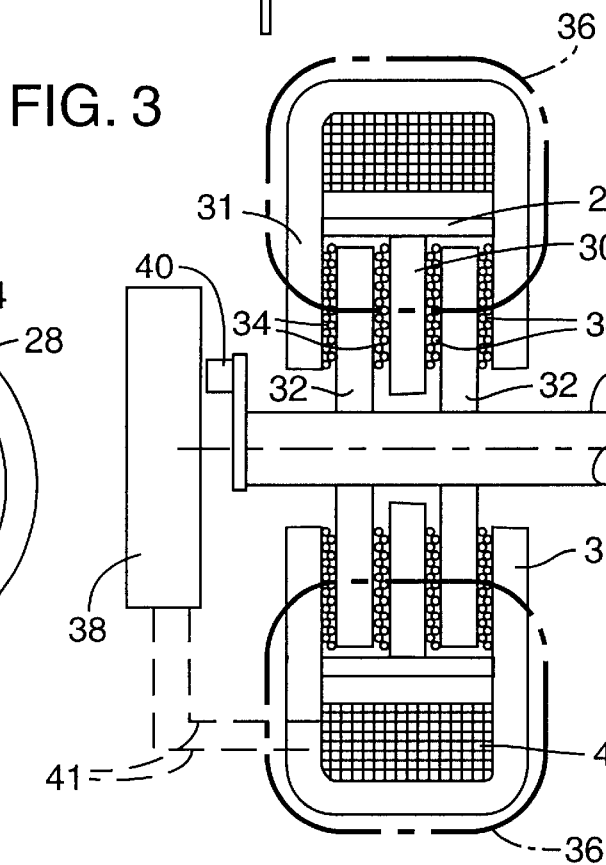
FIG. 3

CONTROL FOR VEHICLE DIFFERENTIAL

FIELD OF THE INVENTION

This invention relates to a control for controlling rotation as between a pair of driven shafts driven by a common drive shaft.

BACKGROUND OF THE INVENTION

An application of the present invention is in the differential of a vehicle's drive line. A propeller shaft provides the drive power and is connected to the differential. Aligned axles extend from the differential at a direction perpendicular to the propeller shaft. An arrangement of gears in the differential transmits torque from the propeller shaft to the axles which in turn transmit the torque to a pair of wheels. The torque of the axles is always equal regardless of the speed of the axles relative to each other. When the axles are connected to wheels having similar tractive capacity, the axles rotate equally or, if the vehicle is in a turn, then they rotate differently according to the turning radius of each wheel. Differential axle rotation in this case is desirable for normal vehicle operation. When the axles are connected to wheels having substantially different tractive capacity, the wheel having lesser tractive capacity may slip, thus causing the axle connected to it to turn faster than the axle connected to the wheel having greater tractive capacity. Differential axle rotation in this case is undesirable for normal vehicle operation.

BRIEF DESCRIPTION OF THE INVENTION

The invention in its preferred form utilizes a planetary gear arrangement. FIG. 1 is a schematic view of such a planetary gear arrangement. Note that shafts 10 and 12 are connected to two axle shafts 50 and 52 through auxiliary gearing (20a, 20b, 22a, 22b) and that shaft 10 is connected to ring gear 14 and shaft 12 is connected to the axis of the planet gears 16. It will be appreciated that reference 18 indicates the sun gear. The rotation of shafts 10 and 12 can be controlled via the coupling of the differently sized auxiliary gears 20a, 20b and 22a, 22b so that sun gear 18 does not rotate as long as the axle shafts 50, 52 rotate at the same speed.

In the example illustrated, ring gear 14 has to rotate faster than the axes of planet gear 16 so that the gear teeth of the planets merely walk around the sun gear. This relationship can be calculated and through various gear reduction technologies, the axles can generate the relative rotation of the shafts 10 and 12 when the wheels or axles are rotating at the same speed to produce zero rotation of sun gear 18. With this relationship established, if the wheel axles are rotated at anything other than equal speed, the relative rotation between shafts 10 and 12 will change and sun gear 18 is then rotated.

As previously explained, it is desirable to allow a difference in rotation as between the wheel axles when turning but not desirable when one of the wheels is slipping. The difference in rotation between the wheels when the vehicle is turning is much less than what wheel slippage will generate. One type of control that responds to the difference in rotation is a centrifugal clutch. FIG. 2 is also schematic and illustrates a centrifugal clutch mechanism for the system of FIG. 1. Sun gear 18 having shoe members 24 are spring biased by springs 26 toward the sun gear 18 and away from a fixed ring 28. When sun gear 18 is rotated, centrifugal force will urge outward movement of the shoes 24 until springs 26 are overpowered whereupon the shoes 24 will engage the fixed ring 28. The shoes 24 then become brake shoes and tend to prevent the shaft 18 from turning any faster. Yet depending on the spring force 26 and shoe weight, some rotation of shaft 18 is permitted before braking will be engaged and this can be designed to accommodate the desired difference for vehicle turning while preventing significant slipping.

Whereas the above control is basically one which allows a determined differential rotation and prevents anything beyond that rotation, there is a need for a more flexible control of the braking arrangement, e.g., the ability to sense different situations, the ability to more rapidly respond, etc., which will hereafter be referred to sometimes as "smart" control. Thus, a preferred embodiment of the invention having smart control incorporates a Magnetorheological Fluid (MRF) clutch and an electronic controller which is schematically illustrated in FIG. 3.

With reference to FIG. 3, which illustrates an alternative "brake" to that of FIG. 2, the sun gear 18 is surrounded by fixed ring 28'. Interleaved plates, extending inwardly from ring 28' (plate 30) and outwardly from sun gear 18 (plates 32) are spaced closely together. The spacing between the plates is filled with MRF (indicated by reference 34). The dot-dash lines 36 passing through the plates 30, 32 represent a magnetic field generated by an electromagnetic coil 42. The electromagnetic coil is activated by electronic controller 38. A rotary permanent magnet 40 is provided on the sun gear 18 and generates an impulse that is detected by a Hall Effect Device incorporated into the controller 38.

MRF is a fluid that carries ferrous particles and when no magnetic field is applied, the fluid, which has a low viscosity, generates little or no resistance to relative movement of the plates 30, 32 and thereby permits free relative rotation of the sun gear 18. When a magnetic field is applied, the particles become polarized and assume a very different property which can be best explained as having a high apparent viscosity. The effect of the higher apparent viscosity material is that of a brake that resists rotation of plates 32 relative to plate 30. The electronic controller 38 generates a magnetic field in response to a set of programmable instructions which in turn is responsive to the impulse generated by permanent magnet 40.

The electronic controller 38 thus monitors the rotative action of the magnet 40 and may react to rotative speed thereof (e.g., the magnetic coil is energized when sun gear 18 reaches a given rpm) or it may react to the angular acceleration of magnet 40 (i.e., the rate of change of the rate of rotation of sun gear 18). When one wheel engages a slippery surface, that wheel rapidly accelerates which can be detected by the controller.

The program may be established to trigger a linear actuation which will produce a lower viscosity and sluggish braking rather than abrupt braking. The program may be altered at will through a manual control provided to the driver who can thus change the permitted rotation of the sun gear from zero rotation to substantially unlimited rotation. Such adjustability is particularly desirable for an all terrain vehicle but, of course, is not limited to such a vehicle.

A major benefit of the concept as described above is that the transmission of differential rotation from the wheel axles to the sun gear 18 through the ring gear 14 and planet gear 16 generates a magnification or amplification of the rotational speed of the sun gear as compared to the difference in rotation of the wheel axles (in one example by 18½ times). This magnification of rotation proportionately reduces the torque and thus the force that is required to brake or reduce the rotation of the sun gear. Whereas MPF may not be effective for directly braking the differential rotation of the wheel axles, as applied to a sun gear of a planetary gear arrangement, the braking applied by the MRF is found to be satisfactory.

Whereas the MRF fluid is the preferred fluid for the application, other materials include ERF and viscous silicon fluid.

The invention will be more fully appreciated by reference to the following detailed description having reference to the accompanying drawings.

BRIEF DESCRIPTION OF THE DRAWINGS

FIG. 1 is a schematic view of a planetary gear arrangement as applied to a differential of a vehicle;

FIG. 2 is a schematic view of a brake arrangement for the system of FIG. 1;

FIG. 3 is a schematic view of an alternate brake arrangement for the system of FIG. 1;

DESCRIPTION OF THE PREFERRED EMBODIMENT

Figure 4:
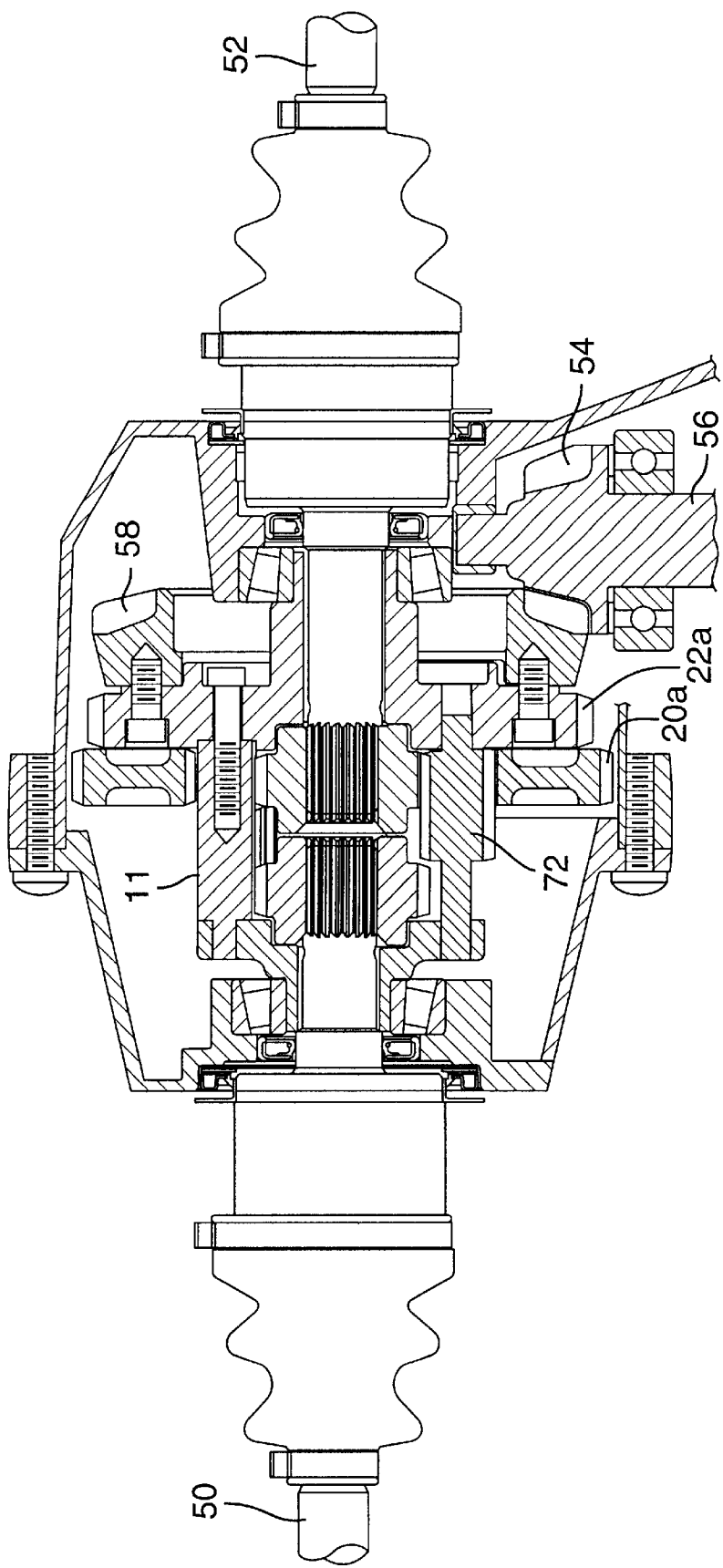
FIG. 4 is a sectional plan view illustrating an application of the control of the invention to a vehicle differential.

FIG. 1 is a schematic illustration of a control for a vehicle differential. The system of FIG. 1 is arranged to control the relative rotational rate of the axles 50, 52 of the vehicle. It is desired of course to allow one axle to rotate at a different rate than the other when the vehicle is in a turning mode such as going around a corner. A brake unit, designated as B is provided to force the axles 50, 52 to rotate at the same rate when the rate of rotation exceeds that of a normal turning mode. An example of a situation where it is desired to control the rate of rotation would be when one axle rotates at a much higher rate than the other such as when one wheel is slipping on ice and the other wheel is not. Without the control and because torque is equally applied to both wheels, because the slipping wheel requires little torque, that same torque applied to the non-slipping wheel is not sufficient to force turning of the wheel. It is then desired to force the axles to rotate in unison whereby the non-slipping wheel provides the desired traction.

The axle 52 is coupled to rotate the shaft 12 through gears 22a and 22b. The shaft 12 is coupled to rotate a planet gear set 16. The gears of the planet gear set 16 are in mesh with a ring gear 14 and a sun gear 18. The axle 50 is coupled to rotate the shaft 10 through gears 20a and 20b. The shaft 10 is coupled to rotate the ring gear 14. When the axles 50, 52 have the same rate of rotation, the rotation of planet gear set 16 and ring gear 14 are synchronized such that the gears of the planet gear set 16 will not impart any rotative motion to the sun gear 18. That is, the gears of the planet gear set 16 will "walk" around the sun gear 18 with the ring gear accommodating the rotation of the gears of the planet gear set. The ratio of the gears 22a, 22b in combination with the ratio of gears 20a, 20b are determined to provide this synchronization. When one of the axles 50, 52 rotates at a greater rate than the other, the rotation of the ring gear 14 and the gears of the planet gear set 16 are not synchronized which causes the sun gear 18 to rotate.

The brake B is provided to apply a braking force to the sun gear 18 to stop the rotation of the sun gear 18. Such forces synchronization of the ring gear and planet gear set which forces the axles 50, 52 to rotate in unison. As previously mentioned, it is necessary to allow the axles 50, 52 to rotate at different rates such as for cornering. As will be later explained, a controller is provided to control the action of the brake B to accommodate the desired differential in the rate of rotation of the axles 50, 52 while preventing the undesired differential in the rate of rotation.

FIG. 2 schematically illustrates one manner of braking the sun gear 18 by a mechanical brake. The sun gear 18 has shoe members 24 pivotally mounted and biased inwardly toward the sun gear 18 by springs 26. A fixed ring 28 surrounds the shoes 24 and the sun gear 18. When the sun gear 18 rotates, centrifugal force will urge the shoes 24 into contact with the fixed ring 28 to cause braking of the sun gear 18. The centrifugal force for urging outward movement of the shoes is related to the rate of rotation of the sun gear 18. Until the centrifugal force is able to overcome the inward force of springs 26, the axles 50, 52 are permitted to have a different rate of rotation.

FIG. 3 illustrates another form of a braking system for controlling the rotational rate of the sun gear 18. In this example the sun gear 18 is surrounded by a fixed ring 28' contained in fixed housing 31. Interleaved plates, plate 30 extending inwardly from the fixed ring 28' and plates 32 extending outwardly from the sun gear 18, are spaced closely together within housing 31. The spacing between the plates 30, 32 and housing 31 is filled with MRF (magnetorheological fluid) indicated by numeral 34. The MRF has the property of being sensitive to a magnetic field. When not magnetized, the MRF functions like a low viscosity lubricant and allows free rotation of plates 32 relative to fixed plate 30. When magnetized, the MRF is polarized and resists relative rotation and has an apparent high viscosity. An electromagnetic coil 42 surrounds the interleaved plates 30, 32. A controller 38 is provided to activate the coil 42 as indicated by dash lines 41 and has an incorporated Hall Effect Device to sense the relative movement of a magnet 40 provided on the rotatable sun gear 18.

When the sun gear 18 rotates, the controller senses the rotation of the magnet 40. The controller may determine the acceleration rate of the magnet 40 and thus the rate of rotation and the acceleration of the sun gear 18. The controller 38 is programmed to energize the coil 42 when the sun gear reaches a determined rate of rotation and/or acceleration. The energized coil 42 creates a magnetic field which controls the polarization of the MRF 34. The polarized MRF will act as a brake to control the relative rotation of the plates 30 and 32. This will cause a braking action of the sun gear 18 which in turn urges the axles 50, 52 to rotate together. It will he appreciated that the controller may be programmed to provide limited relative rotation or full braking of the sun gear. This is accomplished by controlling the field generated by the coil 42 and/or by controllably pulsing the energizing of the coil 42. Such controls can be programmed into the controller 34 but also a manual control can be provided for manipulation by the vehicle operator.

Figure 5:
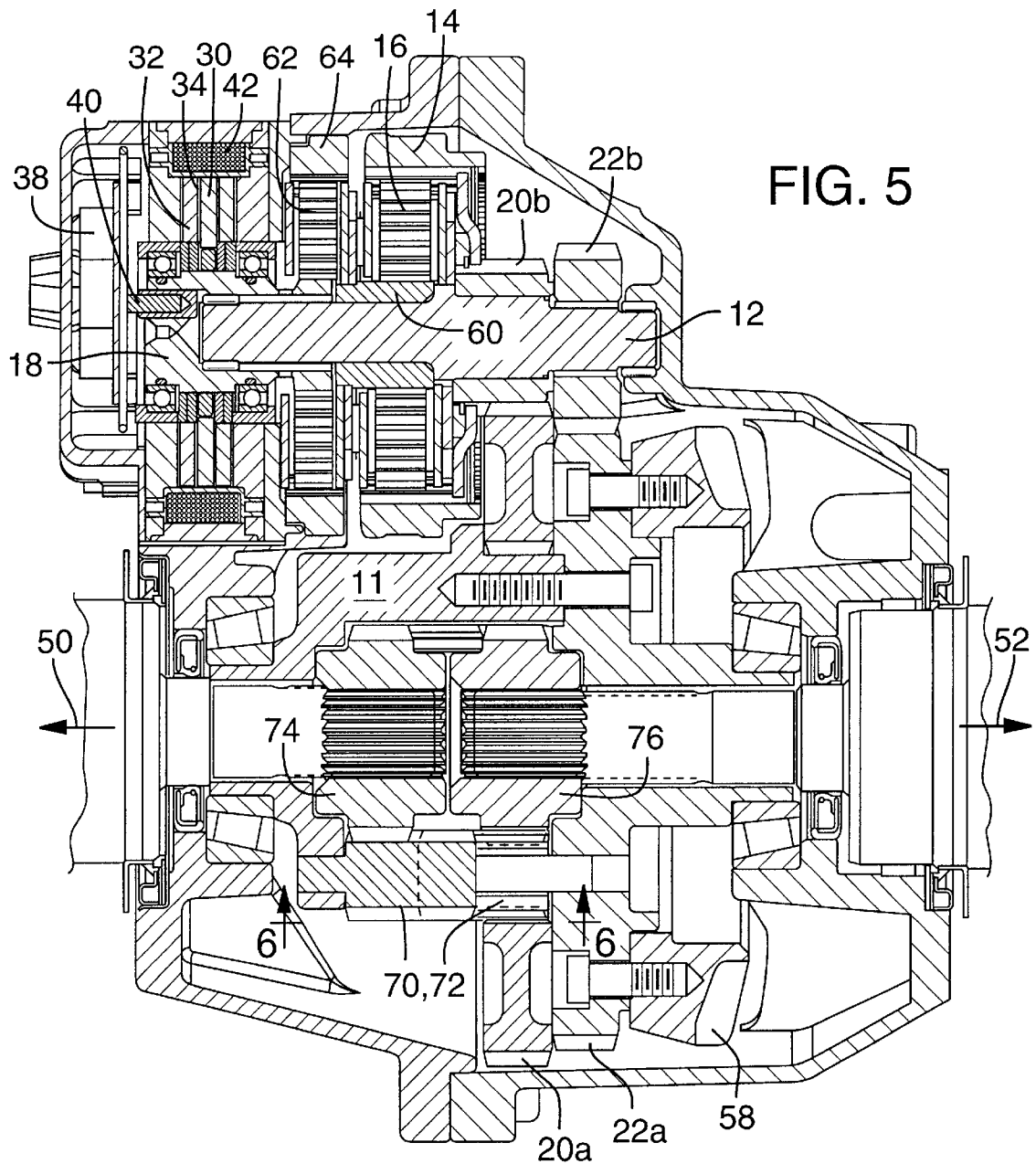
FIG. 5 is a sectional side view of the vehicle differential of FIG. 4.

Refer now to FIGS. 4 and 5 of the drawings which illustrate a control for a vehicle differential. FIG. 4 illustrates an input pinion 54 on a propeller shaft 56 that rotatably drives a ring gear 58 of the differential case 11. Rotation of the differential case 11 causes rotation of the axles 50, 52.

In this embodiment gear 22a is fixedly mounted to the differential case 11. The gear 22a in mesh with gear 22b (FIG. 5) rotatably drives a shaft 12 which is coupled to a planet gear set 16. Rotation of the shaft 12 rotatably drives the planet gear set 16.

Gear 20a (which is rotatable relative to the differential case 11) is in mesh with gear 20b to rotatably drive a ring gear 14. The gear 20b is rotatably mounted on the shaft 12 and is coupled to the ring gear 14. The planet gear set 16 is in meshed engagement with the ring gear 14 and a sun gear 60. The sun gear 60 is rotatably mounted on the shaft 12. The sun gear 60 is coupled to and rotatably drives a planet gear set 62. The planet gear set 62 is in meshed engagement with a fixed ring gear 64 and the sun gear 18.

When the axles 50, 52 have the same rate of rotation the ring gear 14 and the planet gear set 16 are synchronized to be driven at a rate that will cause the planet gear set 16 to "walk" around the sun gear 60 in a manner whereby the sun gear 60 will not be rotatably driven. Accordingly, planet set 62 and sun gear 18 are also not driven.

Figure 6:
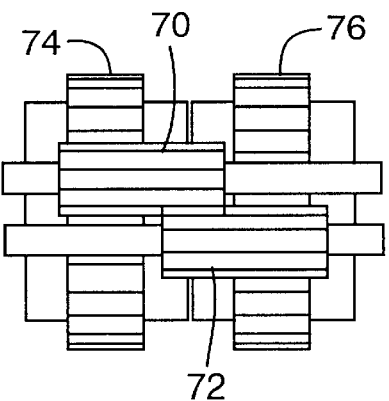
FIG. 6 is a partial view as taken on view lines 6—6 of FIG. 5.

The illustrated differential is of the type that has axle 50 coupled to axle 52 by an overlapping gear set 70, 72. (See FIG. 6) A gear 74 on axle 50 is in meshed engagement with gear 70 and a gear 76 on axle 52 is in meshed engagement with gear 72. The gears 70, 72 are in meshed engagement with each other. Gear 72 is in meshed engagement with the gear 20a and accordingly drives gear 20b and ring gear 14. The desired synchronization occurs only when gears 74, 76 are commonly rotated so that rotation of gear 20a matches rotation of case 11.

When the axle 50 rotates at a different rate than that of axle 52 (during slipping or turning), one of the gears 70, 72 will be rotated relative to the other which changes the rate of rotation of the gear 20a relative to case 11 and thus relative to the gear 22a. This change in rotational rate will cause rotation of the sun gear 60 by the cooperative action of the planet gear set 16 and the ring gear 14. Rotation of the sun gear 60 causes the planet gear set 62 to rotate about the axis of the shaft 12. The planet gear set 62 in engagement with the fixed ring gear 64 will cause rotation of the sun gear 18. The rotation of the sun gear 18 will rotate the magnet 40 about the axis of sun gear 18. The rotation of the magnet 40 will be sensed by the controller 38.

The controller 38 will determine the rate of rotation as well as the acceleration of the magnet 40 to determine the differential in the rotational rate of the axles 50, 52. The controller 38 will, by its determined program, energize the coil 42 to cause polarization of MRF 34 between plates 30, 32 and thereby provide a braking action on the sun gear 18. The sun gear being braked will force the axles 50, 52 to rotate in unison. It will be appreciated that if the brake is actuated to provide limited braking, the axles 50, 52 may not be forced to rotate at the exact same rate but will still have a force applied to cause a rotation rate that is near unity.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A control for a vehicle comprising:

a pair of driven shafts, a common drive shaft and a coupler coupling the drive shaft conjointly to said pair of driven shafts to transmit rotation from the drive shaft to the driven shafts, said coupler configured to transmit balanced torque as between the pair of driven shafts whereby unbalanced resistance to rotation by the pair of driven shafts produces a different rate of rotation as between the driven shafts;

an indicator shaft coupled to the driven shafts in a manner whereby similar rotation of the driven shafts produces substantially no rotation of the indicator shaft and dissimilar rotation of the driven shafts produces rotation of the indicator shaft that is proportional to the difference in the rate of rotation as between the driven shafts; and a brake associated with the indicator shaft preventing rotation of the indicator shaft beyond a determined rate of rotation of the indicator shaft.

2. A control as defined in claim 1 wherein said driven shafts are axles, said coupler is a differential and said drive shaft is a propeller shaft of a vehicle, said indicator shaft being an amplifier shaft, said amplifier shaft being coupled to the axles through a gear reduction arrangement that multiplies the rate of rotation of the amplifier shaft relative to the difference in the rate of rotation of the axles, and similarly reduces the torque applied to the amplifier shaft to facilitate braking.

3. A control as defined in claim 2 wherein said gear reduction arrangement is a planetary gear assembly including a ring gear, planet gears, and sun gear, said amplifier shaft being an extension of the sun gear and said ring gear and said planet gears respectively driven in accordance with rotation of the pair of axles.

4. A control as defined in claim 1 wherein said brake comprises a fixed ring surrounding the amplifier shaft and a first plate extending radially inwardly from the fixed ring and a second plate extending radially outwardly from the amplifier shaft, said first and second plates interleaved and in closely spaced relation and defining spaces between the plates, Magnetorheological Fluid provided in the spaces and a magnetic field provided by an electromagnetic coil surrounding said space, and an electronic controller selectively activating said magnetic field to convert the fluid from a non-resistive media to a resistive media to inhibit rotation of the amplifier shaft at a determined rotation.

5. A control as defined in claim 4 wherein a permanent magnet is provided on the amplifier shaft to generate impulses indicative of rotation of said shaft, said electronic controller receiving the impulses and said electronic controller responsive to the impulses for activating said electromagnetic coil.

6. A control as defined in claim 5 wherein the electronic controller is programmed to respond to the angular acceleration of the amplifier shaft.

7. A control as defined in claim 5 wherein the electronic controller is programmed to respond to rate of rotation of the indicator shaft.

8. A control as defined in claim 5 including a manual setting for said electronic controller for manual adjustment of the determined braking.

* * * * *